April 11, 1961
W. V. TYRLICK ET AL
2,979,695
COMPARATOR DEVICE
Filed July 16, 1959
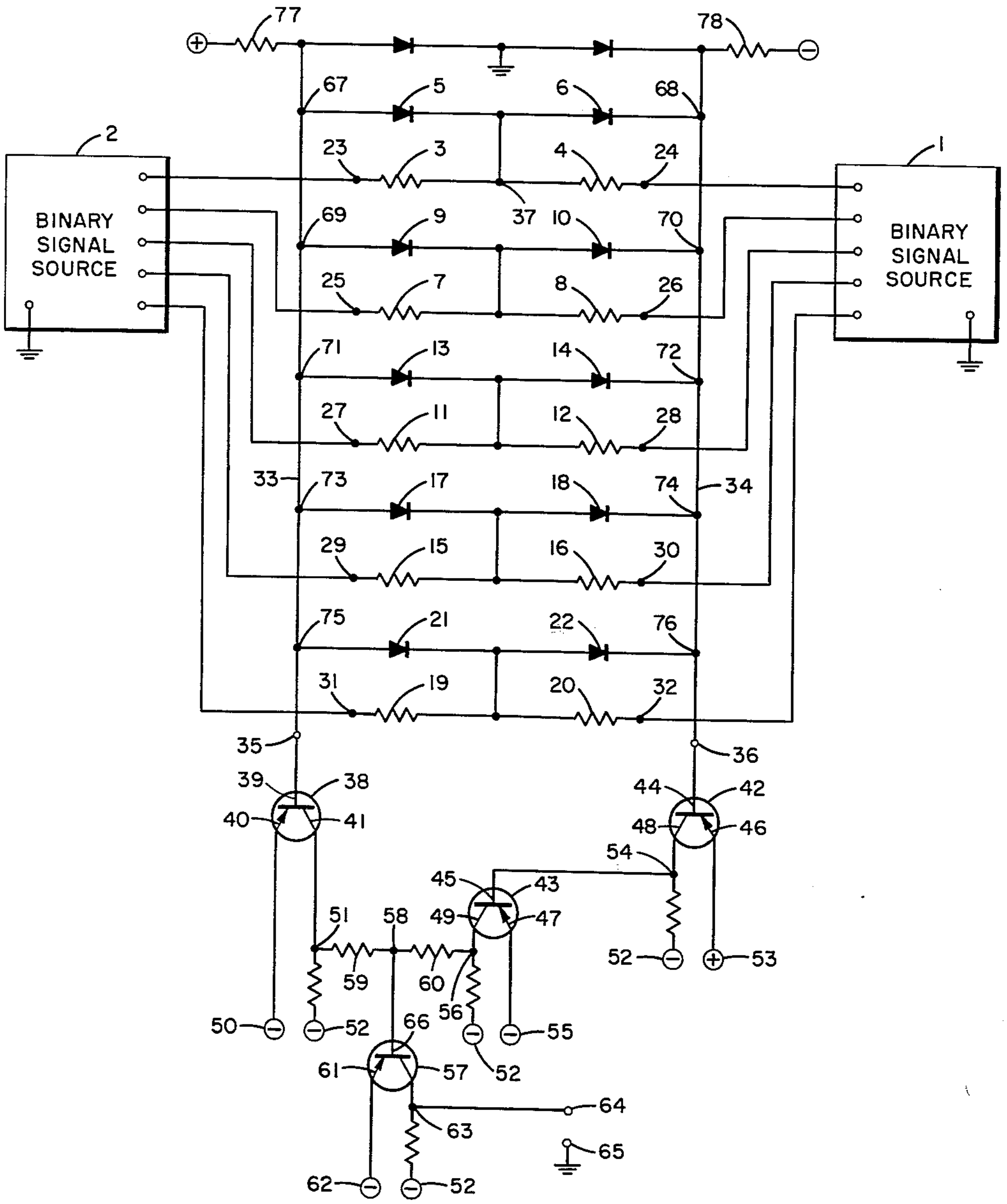
*INVENTOR.*
WILLIAM V. TYRLICK
CHARLES R. FISHER, JR.
*BY* Francis E. Blake
ATTORNEY United States Patent Office 2,979,695
Patented Apr. 11, 1961

2,979,695

COMPARATOR DEVICE

William V. Tyrlick, Rochester, and Charles R. Fisher, Jr., Pittsford, N.Y., assignors to General Dynamics Corporation, Rochester, N.Y., a corporation of Delaware Filed July 16, 1959, Ser. No. 827,650

3 Claims. (Cl. 340—149)

The subject invention relates to comparator devices and, more specifically, to a comparator device of the type which produces an output signal only upon the simultaneous application of two binary code group signals having the same polarity bits occupying the same respective positions within the groups In applications in which data is represented in the form of a binary code, it is frequently necessary to indicate the coincident presence of two identical binary code groups which may emanate from different sources.

In view of the widespread use of applications in which data is represented in binary form, the desirability of a comparator device which is simple in construction and reliable in operation is apparent.

It is, therefore, an object of this invention to provide an improved comparator device.

It is another object of this invention to provide an improved comparator device of the type which will produce an output signal only upon the simultaneous application of two binary code group signals having the same polarity bits occupying the same respective positions within the groups.

It is a further object of this invention to provide an improved comparator device of the type which produces an output signal only upon the simultaneous application of two binary code group signals having the same polarity bits occupying the same respective positions within the groups and employing only solid state components.

In accordance with this invention, an individual gating circuit is provided for each bit position within the binary code group, each of the type having first and second input terminals and first and second output terminals. Each of these gate circuits is arranged to produce with the coincident application to both terminals thereof either "mark" or "space" binary signals, a ground potential signal upon both output terminals, with the coincident application to the first and second input terminals thereof a "mark" and a "space" binary signal, respectively, a positive or negative polarity potential signal, as selected, upon either output terminal and with the coincident application to the first and second input terminals thereof a "space" and a "mark" binary signal, respectively, an opposite polarity potential signal upon the other output terminal. The respective first output terminals and second output terminals of the gating circuits are interconnected with the necessary circuitry for producing a first reference potential signal having a selected polarity and magnitude in response to the presence of a ground potential signal on all of the first output terminals and a second reference potential signal having the same polarity and magnitude as the first reference potential signal in response to the presence of a ground potential signal in all of the second output circuits. The first and second reference potential signals are applied to the necessary circuitry for producing an output signal in response to the application thereto of both the first and second reference potential signals.

For a better understanding of the present invention, together with further objects, advantages and features thereof, reference is made to the accompanying description and single figure drawing which sets forth schematically a preferred embodiment of the comparator device of this invention.

For purposes of illustration only, and without inference or intention of a limitation thereto, the operation of a novel comparator device of this invention will be described on the basis of an application with five bit per group binary code signals.

Two binary code signal sources, which may be, for example, conventional tape readers or conventional storage devices, are indicated in block form by reference numerals 1 and 2 in that the details of these sources form no part of this invention and may be any conventional device which is well known in the art. Each of binary signal sources 1 and 2 is provided with an output terminal for each bit position within the binary code group, as indicated.

In binary code representations, either of the two polarity bits may be selected to be the significant bits. For purposes of illustration, and without inference or intention of a limitation thereto, the "mark" polarity bits will herein be assumed to be the significant bits. For the proper operation of the novel comparator of this invention, it is necessary that the "mark" polarity bits of the binary signals emanating from source 1 be evidenced by the presence of a negative potential signal and that the "space" polarity bits be evidenced by a ground potential signal, while the "mark" polarity bits of the binary code emanating from binary signal source 2 be evidenced by the presence of a positive potential signal of a magnitude equal and opposite to the negative potential signal which evidences the "mark" polarity bits of the signals from binary signal source 1 and that the "space" polarity bits be evidenced by the presence of a ground potential signal. It is to be specifically understood, however, that these relative potentials may be interchanged without departing from the spirit of the invention, but have merely been assumed herein for the purpose of clearly describing the novel comparator device of this invention.

An individual gating circuit is provided for each bit position within the binary code group signals, in this instance five, and are indicated herein by equal resistor pair 3, 4 and diode pair 5, 6 for the first bit position; equal resistor pair 7, 8 and diode pair 9, 10 for the second bit position; equal resistor pair 11, 12 and diode pair 13, 14 for the third bit position; equal resistor pair 15, 16 and diode pair 17, 18 for the fourth bit position and equal resistor pair 19, 20 and diode pair 21, 22 for the fifth bit position. Each of these gating circuits is provided with first and second input terminals indicated by reference numerals 23 and 24, 25 and 26, 27 and 28, 29 and 30, 31 and 32, respectively, and first and second output terminals indicated by reference numerals 67 and 68, 69 and 70, 71 and 72, 73 and 74 and 75 and 76, respectively.

All of the output terminals 67, 69, 71, 73 and 75 are interconnected by bus 33 and are brought out to terminal 35, while all of the other output terminals 68, 70, 72, 74 and 76 are interconnected by bus 34 and brought out to terminal 36.

Each of the individual gating circuits previously described will produce, with the coincident application to both input terminals thereof either "mark" or "space" binary signals, a ground potential signal upon both output terminals, with the coincident application to the first and second input terminals thereof a "mark" and a "space" binary signal, respectively, a positive or negative polarity potential signal, as selected, upon either output terminal and with the coincident application to the first and second input terminals thereof a "space" and a "mark" binary signal, respectively, an opposite polarity potential signal upon the other output terminal. As the operation of each of these gates is identical with every other, the gating circuit consisting of equal resistor pair 3, 4 and diode pair 5, 6 will be described.

With the presence of a "space" polarity bit on each of input terminals 23 and 24 thereof, the mid-point 37 of the equal resistor pair will be at ground potential; hence, a ground potential will be present upon both buses 33 and 34.

With the presence of a "mark" polarity bit upon both input terminals 23 and 24 thereof, mid-point 37 will be again at ground potential in that the equal and opposite signal potentials denoting the "mark" polarity bits, as previously assumed, will be applied in opposition to each other across equal series resistors 3 and 4. Therefore, the potential of buses 33 and 34 will also be ground potential.

The presence of a "mark" polarity bit upon input terminal 23 and a "space" polarity bit upon input terminal 24 will result in a positive potential at point 37 which is substantially equal to one-half the magnitude of the positive potential signal selected to signify the presence of a "mark" polarity bit from binary signal source 2. This positive potential present upon point 37 will forward bias diode 6 to conduction, thereby placing bus 34 at a positive potential substantially equal in magnitude to the potential of point 37.

Upon the presence of a "mark" polarity signal upon input terminal 24 and a "space" polarity signal upon input terminal 23, the potential of point 37 will be negative and of a magnitude substantially one-half the magnitude of the negative potential signal selected to signify the presence of a "mark" polarity bit from binary signal source 1. This negative potential signal present upon point 37 will forward bias diode 5 to conduction, thereby placing bus 33 at a negative potential substantially equal in magnitude to the potential of point 37. As either bus 33 or 34 goes negative or positive, respectively, all of the remaining diodes are back biased, thereby blocking any ground potential signal which may appear at the mid-point of any other series resistor pair from the respective buses.

With this arrangement, therefore, it is apparent that only upon the coincident application of two binary code group signals having the same polarity bits occupying the same respective positions within the groups will result in a ground polarity signal upon each of buses 33 and 34.

Connected to bus 33 through output terminal 35 is a type P-N-P transistor 38 having the usual base, emitter and collector electrodes indicated by reference numerals 39, 40 and 41, respectively.

Connected to bus 34 through output terminal 36 is a pair of transistors 42 and 43 each having the usual base, emitter and collector electrodes indicated by reference numerals 44 and 45, 46 and 47, and 48 and 49, respectively.

With both buses 33 and 34 at ground potential, transistor 38 is nonconductive in that its emitter 40 is biased negatively from source of negative potential 50 to a magnitude equal to substantially one-third the maximum negative potential which may appear on bus 33 to insure proper operating potential relationship. The base 39, being at ground potential, is more positive than the emitter 40, a condition which does not satisfy the base-emitter bias requirements for conduction through a type P-N-P transistor. Therefore, a negative reference potential signal is present at collector 41 of a magnitude substantially equal to the magnitude of source of supply potential 52 which may be taken off point 51. The ground potential of bus 34 is applied through terminal 36 to the base 44 of transistor 42. As the emitter 46 of transistor 42 is connected to a source of positive bias potential 53, the magnitude of which is substantially one-third the magnitude of the highest positive potential which will appear on bus 34 to insure proper operating potential relationships, the base 44 is negative in respect to the emitter 46, a condition which satisfies the base-emitter bias requirements for conduction through a type P-N-P transistor. As transistor 42 conducts, the potential at collector 48 goes from a negative potential of a magnitude substantially equal to that of supply potential source 52 to a positive potential substantially equal to that of positive potential source 53. This positive potential is applied to the base 45 of transistor 43 from point 54. The emitter 47 of transistor 43 is biased negatively by a source of negative potential 55 to a magnitude substantially equal and opposite to the magnitude of the positive potential of source 53. As the base 45 of transistor 43 is at this time positive in respect to the emitter 47 thereof, a condition which does not satisfy the base-emitter bias requirements for conduction through a type P-N-P transistor, transistor 43 is not conducting. With transistor 43 in a state of nonconduction, a second negative reference potential signal is present upon the collector 49 of a magnitude substantially equal to that of the source of supply potential 52 and may be taken off point 56.

The two reference signal potentials of the same polarity and magnitude, which appear at points 51 and 56, respectively, are applied to the base 66 of a type P-N-P transistor 57 from the mid-point 58 of an equal series resistor pair 59 and 60. As the potential of point 58 is substantially equal to one-half the sum of the two reference signal potentials, it biases the base 66 of transistor 57 negatively in respect to the emitter 61 thereof which is biased negatively by source 62 of a magnitude substantially three-quarters of the greatest negative magnitude of the reference signal potentials. As this condition satisfies the base-emitter bias requirements for conduction through a type P-N-P transistor, transistor 57 conducts and point 63 goes from a negative potential substantially equal in magnitude to that of supply potential 52 in a positive direction to a negative potential substantially equal to that of supply potential 62. This positive-going pulse may be taken off output terminals 64 and 65 and applied to external equipment, not shown.

With bus 33 at a negative potential, the base 39 of transistor 38 will be biased negatively through terminal 35 in respect to the emitter 40 in that the magnitude of source 50 is arranged to be of a magnitude substantially one-third the magnitude of the negative potential which will appear on bus 33. As this condition satisfies the base-emitter bias requirements for conduction through a type P-N-P, transistor 38 will begin conduction. As transistor 38 conducts, the reference potential signal of point 51 goes from a negative value substantially equal to that of supply potential 52 in a positive direction to a negative value substantially equal to that of source 50. As the potential of point 58 is equal to substantially one-half the sum of the reference signal potentials, the potential at point 58 is less negative than it was with the full value of reference signal potentials present at both points 51 and 56. As the negative supply potential 62 which biases the emitter 61 of transistor 57 is arranged to be equal to substantially three-quarters the value of the reference signal potentials present at points 51 and 56 with both transistors 38 and 43 not conducting, the base 66 thereof is less negative than the emitter 61 thereof, a condition which does not satisfy the base-emitter bias requirements for conduction through a type P-N-P transistor, hence, transistor 57 is not conducting. At this time, the potential at point 63 remains substantially equal to that of supply potential 52; hence, there is no positive-going signal present upon output terminals 64 and 65.

With bus 34 at a positive potential and bus 33 at a ground potential, the reference signal potential present upon point 51 will, of course, be of the negative magnitude substantially equal to that of supply potential 52, as previously described. The positive potential upon bus 34 which is applied to the base 44 of transistor 42 through terminal 36, arranged to be of a greater positive value than that of source 53 biasing the emitter 46 thereof, renders the base 44 of transistor 42 more positive than the emitter 46, a condition which does not satisfy the base-emitter bias requirements for conduction through a type P-N-P transistor. As transistor 42 becomes nonconducting, the potential at point 54 goes negative to a magnitude substantially equal to that of supply potential source 52. This potential biases the base 45 of transistor 43 negatively in respect to the emitter 47 thereof in that the magnitude of source 55 is adjusted to be substantially equal to one-third the magnitude of that of source 52, a condition which satisfies the base-emitter bias requirements for conduction through a type P-N-P transistor. As transistor 43 conducts, the reference signal potential upon point 56 goes to a negative magnitude substantially equal to that of source 55. During this condition, the potential of point 58 is equal to substantially one-half the sum of the reference signal potentials present upon points 51 and 56. As has previously been pointed out, this potential is not great enough to forward bias transistor 57, which remains in a nonconducting condition. With transistor 57 nonconducting, the potential at point 63 remains unchanged and no positive-going output signal appears across output terminals 64 and 65.

With buses 33 and 34 at negative and positive potentials, respectively, the reference signal potentials present upon points 51 and 56 will be of a negative value but of a magnitude substantially equal to that of sources 50 and 55, respectively, the magnitudes of these sources are arranged to be substantially equal to one-third the maximum negative and positive potential, respectively, which will appear on buses 33 and 34. These potential magnitudes are also much less negative than that of supply source 52, therefore, the potential at point 58 will not be of a negative magnitude great enough to cause conduction through transistor 57. In this condition also, the potential at point 63 remains negative and of a magnitude substantially equal to supply potential source 52, with no resulting positive-going output signal present on output terminals 64 and 65.

To prevent buses 33 and 34 from merely "floating," biasing potentials of positive and negative polarities may be connected thereto through equal resistors 77 and 78, respectively, each of which is of a relatively high resistance value.

From this description, it is apparent that only with the coincident presence of ground potential signals upon both buses 33 and 34 will a positive-going output potential be produced upon output terminals 64 and 65.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. A comparator device of the type which produces an output signal only upon the simultaneous application of two binary code group signals having the same polarity bits occupying the same respective positions within the groups comprising individual gating circuit means corresponding to each bit position within the binary code group signals to be compared, each of the type having first and second input terminals, first and second output terminals and which produces, with the coincident application to both terminals thereof either "mark" or "space" binary signals, a ground potential signal upon both output terminals, with the coincident application to the first and second input terminals thereof a "mark" and a "space"

binary signal, respectively, a positive or negative polarity potential signal as selected upon either output terminal and with the coincident application to the first and second input terminals thereof a "space" and a "mark" binary signal, respectively, an opposite polarity potential signal upon the other output terminal; first bus means for interconnecting all of said first output terminals; second bus means for interconnecting all of said second output terminals; a first transistor device connected to said first bus means for producing a first reference potential signal having a selected polarity and magnitude in response to the presence of a ground potential signal upon said first bus means; second and third transistor devices connected to said second bus means for producing a second reference potential signal having the same polarity and magnitude as said first reference potential signal in response to the presence of a ground potential signal upon said second bus means; a fourth transistor device for producing an output signal in response to the simultaneous application thereto of said first and second reference potential signals and output circuit means connected to said fourth transistor device from which said output signal may be removed.

2. A comparator device of the type which produces an output signal only upon the simultaneous application of two binary code group signals having the same polarity bits occupying the same respective positions within the groups comprising individual gating circuit means corresponding to each bit position within the binary code group signals to be compared, each of the type having first and second input terminals, first and second output terminals and which produces, with the coincident application to both terminals thereof either "mark" or "space" binary signals, a ground potential signal upon both output terminals, with the coincident application to the first and second input terminals thereof a "mark" and a "space" binary signal, respectively, a positive or negative polarity potential signal as selected upon either output terminal and with the coincident application to the first and second input terminals thereof a "space" and a "mark" binary signal, respectively, an opposite polarity potential signal upon the other output terminal; first bus means for interconnecting all of said first output terminals; second bus means for interconnecting all of said second output terminals; a first transistor device connected to said first bus means for producing a first reference potential signal having a selected polarity and magnitude in response to the presence of a ground potential signal upon said first bus means; second and third transistor devices connected to said second bus means for producing a second reference potential signal having the same polarity and magnitude as said first reference potential signal in response to the presence of a ground potential signal upon said second bus means; an equal series resistor pair voltage divider network; means for applying said first and second reference potential signals across said voltage divider network; a fourth transistor device for producing an output signal in response to the simultaneous application thereto of the resultant of said first and second reference potential signals taken from said voltage divider network and output circuit means connected to said fourth transistor device from which output signal may be removed.

3. A comparator device of the type which produces an output signal only upon the simultaneous application of two binary code group signals having the same polarity bits occupying the same respective positions within the groups comprising individual gating circuit means corresponding to each bit position within the binary code group signals to be compared, each of the type having first and second input terminals, first and second output terminals and which produces, with the coincident application to both terminals thereof either "mark" or "space" binary signals, a ground potential signal upon both output terminals, with the coincident application to the first and second input terminals thereof a "mark" and a "space" binary signal, respectively, a positive or negative polarity potential signal as selected upon either output terminal and with the coincident application to the first and second input terminals thereof a "space" and a "mark" binary signal, respectively, an opposite polarity potential signal upon the other output terminal; first bus means for interconnecting all of said first output terminals; second bus means for interconnecting all of said second output terminals; a first transistor device connected to said first bus means for producing a first reference potential signal having a selected polarity and magnitude in response to the presence of a ground potential signal upon said first bus means; second and third transistor devices connected to said second bus means for producing a second reference potential signal having the same polarity and magnitude as said first reference potential signal in response to the presence of a ground potential signal upon said second bus means; an equal series resistor pair voltage divider network; means for applying said first and second reference potential signals across said voltage divider network, a fourth transistor device connected to the midpoint of said voltage divider network for producing an output signal in response to the application thereto of the resultant of said first and second reference potential signals and output circuit means connected to said fourth transistor device from which said signals may be removed.

References Cited in the file of this patent

UNITED STATES PATENTS 2,752,489 Aigrain ---------------- June 26, 1956